(No Model.) 2 Sheets—Sheet 1.
H. G. SAWYER.
MECHANISM FOR SHAPING THE WELDING EDGES OF PLOW POINTS.
No. 530,204. Patented Dec. 4, 1894.
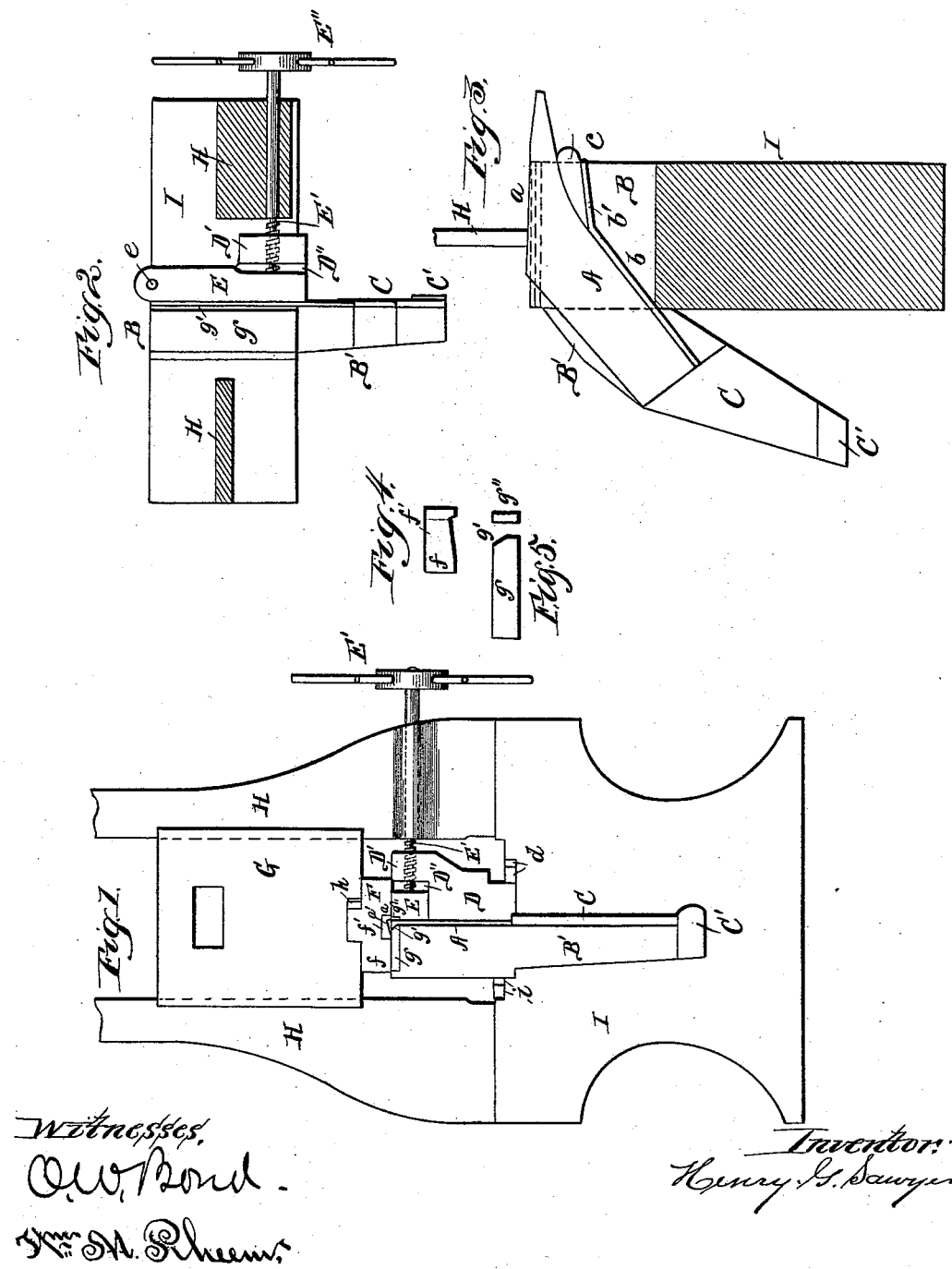

(No Model.) 2 Sheets—Sheet 2.

H. G. SAWYER.
MECHANISM FOR SHAPING THE WELDING EDGES OF PLOW POINTS.

No. 530,204. Patented Dec. 4, 1894.

Witnesses
C. W. Bond
Wm. M. Rheem

Inventor
Henry G. Sawyer

UNITED STATES PATENT OFFICE.

HENRY G. SAWYER, OF CARPENTERSVILLE, ILLINOIS.

MECHANISM FOR SHAPING THE WELDING EDGES OF PLOW-POINTS.

SPECIFICATION forming part of Letters Patent No. 530,204, dated December 4, 1894.

Application filed January 12, 1893. Serial No. 458,175. (No model.)

*To all whom it may concern:*

Be it known that I, HENRY G. SAWYER, a citizen of the United States, residing at Carpentersville, in the county of Kane and State of Illinois, have invented certain new and useful Improvements in Dies and Mechanism for Shaping the Welding Edges of Plow-Points; and I do hereby declare that the following is a full, clear, and exact description of the invention, which will enable others skilled in the art to which it pertains to make and use the same, reference being had to the accompanying drawings, in which—

Figure 6:
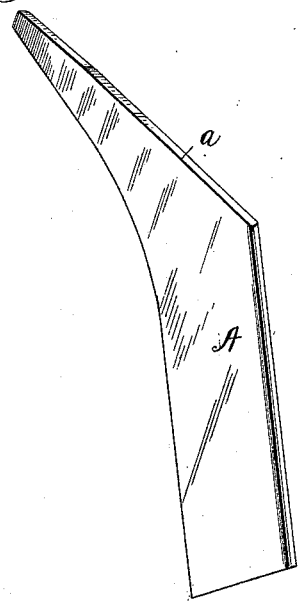
Figure 7:
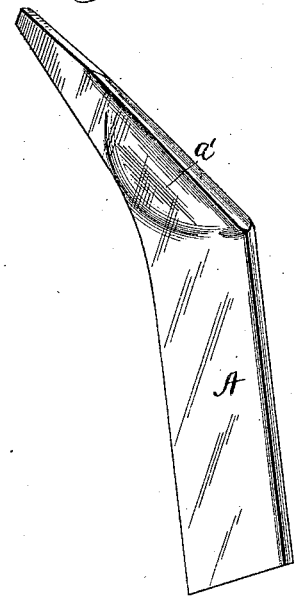
Figure 8:
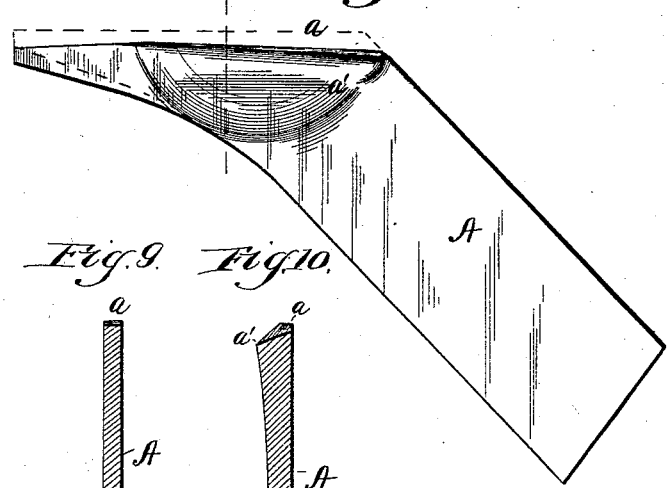
Figure 9:
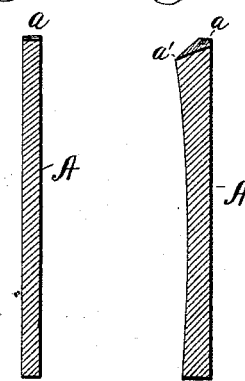
Figure 10:
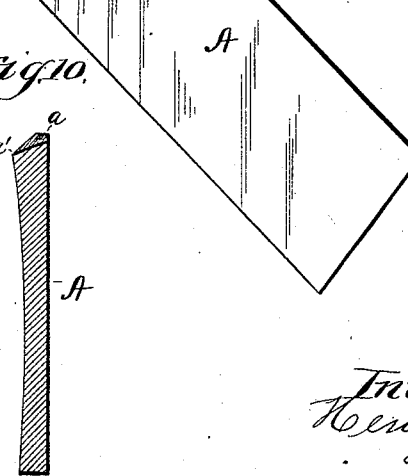

Figure 1, is a front elevation of the dies and mechanism for shaping the welding edge of the plow point, showing the plow point in position to be operated upon. Fig. 2, is a top, or plan view, showing the anvil and the blocks supporting the plow point with the standards for the drop hammer in section. Fig. 3, is a cross-section through the anvil, showing one of the blocks for holding the plow point, with the plow point in position. Fig. 4, is an end elevation of the upper die. Fig. 5, is an end elevation of the lower die. Fig. 6, is a perspective view of the plow point before being operated upon. Fig. 7, is a perspective view of the plow point after being operated upon. Fig. 8, is a side elevation of the plow point with the welding edge formed thereon, as in Fig. 7. Fig. 9, is a sectional elevation of a plow point before being operated upon. Fig. 10, is a sectional elevation of the plow point, after being operated upon.

It is the practice to form the plow point, and the point for the land side of the plow in separate pieces, and then weld the two together to complete the structure, and the practice has been to upset the welding edge of the plow point by hand, which is an expensive and tedious operation and the results are not satisfactory, as it is impossible to form the welding edge properly; and to obviate the objections in forming the welding edge by hand, it has been customary to weld a small strip adjacent to and forming part of the welding edge for the plow point; but this operation, like the operation of forming the welding edge by hand, is expensive and tedious and while a broader welding face or edge is had, such edge or face is in fact no better than the welding edge or face formed by hand, and in both operations the time required enables but a few points to be completed in a day's work.

The object of the present invention is the production of a plow point having a straight, uniform welding edge or face, which has sufficient material to form a perfect weld when the plow point is united to the point of the land side, and which does not require any adjustment or fitting in order to have a perfect weld, and a solid union between the the plow point and the point of the land side; and its nature consists in a plow point having a welding edge or face formed thereon by upsetting the edge of the plow point to be welded, through the medium of properly shaped dies, giving a straight, uniform and broad welding edge or face; in providing a support for holding the plow point edgewise, for the edge to be operated upon to lie in proper relation with the upsetting dies; in providing a movable head or jaw, and a stationary head or block furnishing a support and clamp for the plow point, and holding such point firmly in correct relation to the upsetting dies; in providing shaping dies having co-acting faces operating to upset and swell the welding edge of a plow point for giving a perfect welding face; in providing upper and lower dies with co-acting faces, for producing a straight, uniform and broad welding edge or face; and in the several parts and combination of parts hereinafter described and pointed out in the claims as new.

In the drawings:—A represents the plow point cut or formed from a steel plate, or otherwise, of the shape shown in Figs. 3 and 6, or other desired shape, and having an edge $a$ to be welded to the land side point, which edge when the plow point is ready for use and has been formed into shape, has an overhanging lip or portion $a'$ forming a straight, broad edge or face for welding purposes on the edge $a$, as clearly shown in Figs. 7, 8, and 10, with a reserve of metal sufficient to form a solid weld or union when the plow point is welded to the point of the land side.

B, is a block having an arm or support B', and having on its inner face a ledge $b$, extending across the face of the block B, and of the arm or support B', on an incline, as shown in Fig. 3, with its outer portion $b'$ on a less incline, as shown in said Fig. 3, and this ledge for the inclined portion $b$ receives the edge of the plow point and furnishes a support for the point.

C, is a stop, attached to the face of the arm or support B', and having its upper edge formed for the end of the plow point to abut against, or rest on the upper edge of the stop C and hold the plow point against end movement when struck by the movable die, and this stop C, at its lower end rests on or abuts against the head or ledge C' on the end of the arm or support B', and attached firmly to the anvil of the machine, and in order to fill the space between the forward end $b'$ of the ledge $b$ and the edge of the plow point, a block $c$, having its edges formed to fit on the ledge $b'$ and against the edge of the plow point is used, as shown in Fig. 3, which block $c$ varies in size to be used with different sized plow points, and the supporting rest or plate C can likewise be formed of different sizes to suit different sized plow points, or can be made of a size for the longest plow point, and for shorter plow points, wedges or strips can be used to fill the space between the edge of the stop or plate C, and the end of the plow point A.

D, is a head or block, forming with the head or block B the support for the plow point, the two heads or blocks B being firmly bolted together so as to leave a space between them, extending from the ledge $b$ upward, in which space the plow point is placed to be upset on the edge $a$ by the action of the dies. The head or block D has an upward extension D', between which and the head or block D is an open space D'' in which is located a swinging block or jaw.

E, is a swinging block or jaw, pivoted at its rear end by a suitable point or pivot $e$ to the head or block D, and the forward end of the swinging head or jaw E is connected with the end of a screw E', passing through the extension D' and having a stem, in the construction shown, extending through one of the uprights, or standards for the drop hammer, which stem on its outer end has a hand-wheel E'', by means of which the screw E' can be turned to open and close the swinging head or jaw E for the admission of the plow point, and firmly clamping the point between when in position.

F, is a movable or striking head, in which is firmly secured a die $f$, having a notch or recess $f'$ cut therein, of the shape shown in Fig. 4: that is, with one side having a more abrupt incline than the other. The co-acting die $g$ is firmly secured in the top face of the head or block B, and has an edge adjacent to the plow point with an incline $g'$, to co-act with the notch or recess $f'$ in the die F, the two dies $f$ and $g$ being set in relation to the plow point and to each other, as shown in Figs. 1 and 4, and as shown the inner face of the swinging head or jaw E has a steel strip $g''$ secured therein, to give a firm support to the edge of the plow point at the upsetting line.

G, is the drop hammer, carrying the head F, which head has a tongue entering a groove in the drop hammer G, which tongue is firmly locked in the groove by wedges $h$, in the construction shown, firmly securing the head F to the drop hammer G.

H, are the standards or guides for the drop hammer G, which standards and the drop hammer can be of any of the usual and well known forms of construction.

I, is the anvil having the standards H secured thereto in any usual and well known manner, and on which the heads or blocks B and D are placed; the block D being held firmly in position by wedges $d$, and the block B being held firmly in position by wedges $i$, in the construction and arrangement shown.

The head or block B with its arm or support B', is placed in position for the arm or support to rest on the block C', and the head or block D with the swinging arm or head E, is likewise placed in position on the anvil I, and the two blocks B and D are then firmly locked to the anvil. The stop plate C is placed in position on the arm or support B', and the screw E' engaged at its end with the swinging head or jaw E, the screw passing through the extension D' and its stem through the standard H, and the hand-wheel E'' is secured firmly to the outer end of the stem of the screw. The die $g$ is firmly secured in the top or upper face of the head or block B, and the guard strip $g''$ is secured in the face of the swinging head or jaw E, but this guard strip is not a necessity, as the face of the swinging head or jaw E will form a support in and of itself without the addition of the strip $g''$. The die $f$ is firmly secured in the head F to have its notch or recess $f'$ in proper relation with the edge $g'$ to upset and swell the welding edge of the plow point, and the head F is firmly secured in the drop hammer G, and the drop hammer connected with the standards H, completing the mechanism ready for use.

In use the plow point A is placed in the opening therefor between the heads B and D, for which purpose the swinging head or jaw E is swung back or open and the plow point when in position, rests at its end against the stop or abutment C, and on the rib or rest $b$ and the space between the rib or rest $b'$ and the edge of the plow point is filled by the head or plate $c$, giving the plow point a firm support on its under edge and at its rear edge the entire length, and when the plow point is in place the screw E' is advanced through the hand-wheel E'' closing the swinging head or jaw E, and firmly clamping and holding the plow point between the heads or blocks B and D, with the edge $a$ slightly above the top or upper face of the die $g$, as shown in Fig. 3. The hammer G is then operated for the die $f$ to strike the projecting portion of the edge $a$, and turn and upset the edge $a$, forming an overhanging lip or swell $a'$, which is a continuation of the edge or face $a$ making such face broad as required for welding purposes and at the same time maintaining the edge or face $a$ straight and of a uniform contour, and this lip or swell $a'$ is had by the action of the notch or recess $f'$ in connection with the edge $g'$ by which the metal is turned or driven down to fill the space formed by the beveled edge or face $g'$ and at the same time the die $f$ maintains the edge $a$ perfectly straight.

The ledge $b$ need not be movable, as different lengths of plow points can be set in position for the proper projection of the edge $a$ above the top or upper face of the die $g$ to form the overhanging lip or swell $a$, by increasing the length of the abutment or stop C, for short plow points, that is by using a longer abutment or stop C, or by using wedges to fill the spaces between the edge of the abutment or stop C and the end of the plow point, and the wedge or plate $c$ can be changed to suit the size of the plow point, so that the dies $f$ and $g$ can be used and be operative for plow points of varying length and finish the plow points with a welding face $a$, broad and straight, with an overhanging lip or swell $a$, giving the necessary metal for a solid weld.

The upsetting of the edge $a$ drives the metal back to the opposite edge producing the swell on one side of the plow point, as shown in Figs. 7, 8, and 10, and this swell thickens the metal and gives the required amount of material to properly shape the point for attachment to the plow, without decreasing the thickness, so that the plow point when attached will have a uniform thickness and at the same time will be firmly welded to the land side point with the metal necessary to give the required curvature for the curved edge of the point.

The plow point blank is of a greater length than the completed point, and the increased length is taken up by the overturning of the edge $a$ for the welding edge and the swelling between such edge and the opposite edge and the length and the form of the plow point blank and the completed point, is shown by the dotted lines in Fig. 8.

What I claim as new, and desire to secure by Letters Patent, is—

1. The combination of a head or block, a rest on the head or block for the edge of the plow point, an abutment on the head or block for the end of the plow point, a swinging head or jaw for clamping the plow point when set edgewise on the head or block, a die having a beveled acting edge, and a movable die having a double beveled recess for upsetting and swelling the welding edge of a plow point, substantially as specified.

2. The combination of a head or block a rest on the head or block for the edge of a plow-point, an abutment on the head or block for the end of the plow-point, a swinging head or jaw adapted to clamp the plow-point when set edgewise in the head or block, and a movable die and stationary die adapted to be forced together and upset and swell the welding edge of a plow-point, substantially as described.

HENRY G. SAWYER.

Witnesses:
O. W. BOND,
F. W. ROBINSON.